(12) United States Patent
Bioret (10) Patent No.: US 11,399,503 B2
(45) Date of Patent: Aug. 2, 2022

(54) MATTRESS FOR PROVIDING THERMAL COMFORT TO ANIMALS IN A FARM ENCLOSURE

(71) Applicant: BIORET AGRI-LOGETTE CONFORT, Nort sur Erdre (FR)

(72) Inventor: Jean-Vincent Bioret, Petit Mars (FR)

(73) Assignee: BIORET AGRI-LOGETTE CONFORT, Nort-sur-Erdre (FR)

( * ) Notice: Subject to any disclaimer, the term of this patent is extended or adjusted under 35 U.S.C. 154(b) by 45 days.

(21) Appl. No.: 16/962,004

(22) PCT Filed: Jan. 21, 2019

(86) PCT No.: PCT/FR2019/050119
§ 371 (c)(1),
(2) Date: Jul. 14, 2020

(87) PCT Pub. No.: WO2019/141955
PCT Pub. Date: Jul. 25, 2019

(65) Prior Publication Data
US 2020/0344974 A1 Nov. 5, 2020

(30) Foreign Application Priority Data
Jan. 22, 2018 (FR) ...................................... 1850479

(51) Int. Cl.
*A01K 1/015* (2006.01)

(52) U.S. Cl.
CPC .......... *A01K 1/0158* (2013.01); *A01K 1/0157* (2013.01)

(58) Field of Classification Search
CPC .. A01K 1/0157; A01K 1/0158; F24D 3/1066; F24D 19/082; A47C 21/04; A47C 27/15
See application file for complete search history.

(56) References Cited

U.S. PATENT DOCUMENTS 5,033,136 A * 7/1991 Elkins .................... A47C 21/04
5/421
5,044,027 A * 9/1991 Moon .................... A47C 27/00
5/448

(Continued)

FOREIGN PATENT DOCUMENTS

DE 202008001603 U1 5/2008
FR 3042383 A1 4/2017

(Continued)

OTHER PUBLICATIONS

International Search Report, dated Apr. 5, 2019, from corresponding PCT application No. PCT/FR2019/050119.

*Primary Examiner* — Joshua J Michener
*Assistant Examiner* — Henry Hooper Mudd
(74) *Attorney, Agent, or Firm* — Nixon & Vanderhye (57) ABSTRACT

Disclosed is a mattress for thermal comfort of animals in a livestock enclosure, wherein the comfort mattress includes at least one resilient layer including: at least one sealed chamber, intended to contain a first heat-transfer fluid, and at least one watertight duct, intended to contain a second heat-transfer fluid, at least one section of which passes through the at least one sealed chamber between the upper and lower surfaces thereof so that the at least one section is intended to soak/to bathe in the first heat-transfer fluid. The at least one watertight duct includes at least two through-orifices, to generate a circulation of the second heat-transfer fluid within the at least one watertight duct, between the through-orifices thereof.

14 Claims, 3 Drawing Sheets

(56) References Cited

U.S. PATENT DOCUMENTS

| | | | |
|---|---|---|---|
| 8,397,677 B2* | 3/2013 | Bruer | A01K 1/00 119/448 |
| 2018/0000255 A1* | 1/2018 | Youngblood | A47C 21/04 |

FOREIGN PATENT DOCUMENTS

| GB | 2447287 A | 9/2008 |
|---|---|---|
| WO | 2017/064417 A1 | 4/2017 |

* cited by examiner

MATTRESS FOR PROVIDING THERMAL COMFORT TO ANIMALS IN A FARM ENCLOSURE

TECHNICAL FIELD TO WHICH THE INVENTION RELATES

The present invention generally relates to the field of equipment for thermal comfort of animals in a livestock enclosure.

It more particularly relates to a mattress for thermal comfort of animals in a livestock enclosure, a system including such a mattress and the method of manufacturing such a mattress.

TECHNOLOGICAL BACK-GROUND

The animal comfort is a determining parameter in the breeding efficiency.

This comfort influences in particular the health of the animals, the way they eat, the quantity of food they ingest as well as their fertility and longevity.

For that purpose, commonly, when in stable, the cattle have a rest individually in stalls, also commonly called "free stalls", in which they are free to stand up or lie down.

When carrying out these movements, the animals are liable to hurt themselves. This is in particular the case when the bedding is consisted of concrete covered with straw, which does not protect the animal against slide risks.

To limit this type of incident and the injuries that ensue therefrom, it is known to equip the ground of these stalls with mattresses adapted to improve the animal bedding comfort.

These comfort mattresses conventionally comprise at least one resilient layer that is adapted to undergo an elastic deformation, underlying an upper surface on which an animal rests.

The comfort also comprises a "thermal" component.

Indeed, in case of high heat or intense cold, the animals are liable to undergo a harmful phenomenon called "thermal stress".

Such a thermal stress results in particular in defense behaviour manifestations, a fall of the zootechnical performances, a deterioration of the breeding parameters and an increase of the pathologies.

Within this context, there exists a need for a system aiming at favouring the thermal comfort of the animals present in the livestock enclosure, in particular when they have a rest within their stalls.

OBJECT OF THE INVENTION

Within this context, the applicant has developed a mattress for thermal comfort of animals in a livestock enclosure, wherein said comfort mattress comprises at least one resilient layer and has two opposite faces:
  an upper face, adapted to undergo an elastic deformation and including at least one accommodation area on which an animal is intended to rest, and
  a lower face, intended to rest on a receiving surface,
  wherein said at least one resilient layer includes:
  at least one sealed chamber, intended to contain a first heat-transfer fluid and extending under said at least one accommodation area, wherein said at least one sealed chamber is delimited by an upper surface and by a lower surface, and
  at least one watertight duct, intended to contain a second heat-transfer fluid, at least one first section of which passes through said at least one sealed chamber between the upper and lower surfaces thereof so that said at least one section is intended to soak/to bathe in said first heat-transfer fluid,
  wherein said at least one resilient layer includes at least one through-orifice for access to said at least one sealed chamber, and
  wherein said at least one watertight duct includes at least two through-orifices, to generate a circulation of said second heat-transfer fluid within said at least one watertight duct, between the through-orifices thereof.

Such a mattress has hence for interest to allow a control of the temperature of a surface with which the animal is directly in contact.

This temperature is then adjusted as a function of the surrounding thermal conditions.

For example, in case of high temperatures, the comfort mattress may be refrigerated on surface, so as to cool down the animal present and hence limit the increase of the body temperature of the latter.

As an alternative or a complement, in case of cold temperatures, the comfort mattress may be heated so as to warm up the animal present.

It is hence possible to limit, or even eliminate, the risk of thermal stress for the animals present in the livestock enclosure.

Said at least one section of said at least one watertight duct is intended to soak/to bathe in the first heat-transfer fluid filling the sealed chamber. This section will hence be able to perform heat exchanges over its whole periphery (advantageously over 360°) with the first heat-transfer fluid.

Other non-limitative and advantageous characteristics of the comfort mattress according to the invention, taken individually or according to any technically possible combination, are the followings:
  said at least one comfort mattress comprises several watertight ducts that extend parallel, or at least approximately parallel, relative to each other; said watertight ducts are advantageously distributed over at least one general plane extending parallel to the general plane of said at least one comfort mattress; preferably, the watertight ducts are juxtaposed to each other and independent from each other, or the watertight ducts are formed in at least one band and are connected by interlayer bands;
  said at least one watertight duct has an elongated rectilinear shape;
  said at least one resilient layer includes two longitudinal edges, and said at least one watertight duct extends parallel, or approximately parallel, to said longitudinal edges;
  said at least one resilient layer has two transverse edges, and the two through-orifices of said at least one watertight duct are each arranged at one of said transverse edges, and the means for generating a circulation of said second heat-transfer fluid consist, as the case may be, of means for generating a parallel circulation within said watertight ducts, between said through-orifices;
  the mattress comprises at least two of said sealed chambers that are arranged in series, each within one accommodation area, and at least one watertight duct passes successively through said at least two sealed chambers arranged in series;
  said at least one watertight duct consists of a tubular member made of an elastically deformable material, for example rubber; said at least one watertight duct includes an outer diameter comprised between 25 and 100 mm, an inner diameter comprised between 10 and 98 mm, and a wall thickness comprised between 0.5 and 2.5 mm;

said at least one resilient layer is made single-piece, wherein said resilient layer defines said at least one sealed chamber and said at least one watertight duct;

said at least one sealed chamber is delimited by peripheral bands, and said at least one watertight duct includes at least two sections embedded in one at least of said peripheral bands, advantageously two opposite peripheral bands.

The invention also proposes a system for thermal comfort of animals in a livestock enclosure, wherein said comfort system comprises:

(a) at least one comfort mattress according to the invention, and (b) means for generating a circulation of said second heat-transfer fluid within said at least one watertight duct, between the through-orifices thereof.

This system for thermal comfort of animals also advantageously comprises means for regulating the temperature of said second heat-transfer fluid.

These heat regulation means are preferably chosen among means adapted to heat up and/or cool down said second heat-transfer fluid.

The invention also relates to a livestock enclosure equipped with a comfort system according to the invention.

Preferably, this comfort system comprises stalls; said at least one comfort mattress covers the ground of one at least of said stalls; and wherein said at least one comfort mattress includes several sealed chambers that each extend within one of said stalls.

The invention also proposes a method for improving the thermal comfort of animals in a livestock enclosure according to the invention, wherein said method comprises:

a circulation of the second heat-transfer fluid in said watertight ducts of said at least one comfort mattress, and possibly, a regulation of the temperature of said second heat-transfer fluid, to regulate the temperature of said first heat-transfer fluid and of the upper face of said at least one comfort mattress.

This method advantageously consists in adjusting the following pressures:

a pressure in first heat-transfer fluid of the order of 1 atm (or slightly higher than 1 atm), with no animal, and a pressure in second heat-transfer fluid from 0.25 to 4 bars.

The invention also relates to a method of manufacturing a comfort mattress according to the invention, wherein said manufacturing method comprises:

(i) a step of superimposing sub-layers of elastomeric material including two opposite surfaces, between which are added:

interlayer means adapted to prevent locally the fastening together of said opposite surfaces of said sub-layers to form said at least one sealed chamber, and said at least one watertight duct, at least one section of which is added between said interlayer means, then (ii) a step of fastening the surfaces in contact of said superimposed sub-layers, outside the outline of the interlayer means, so that the interlayer means form said at least one sealed chamber surrounding a first section of said at least one watertight duct.

DETAILED DESCRIPTION OF AN EMBODIMENT

The following description in relation with the appended drawings, given by way of non-limitative example, will allow a good understanding of what the invention consists of and of how it can be implemented.

COMFORT SYSTEM

Figure 1:
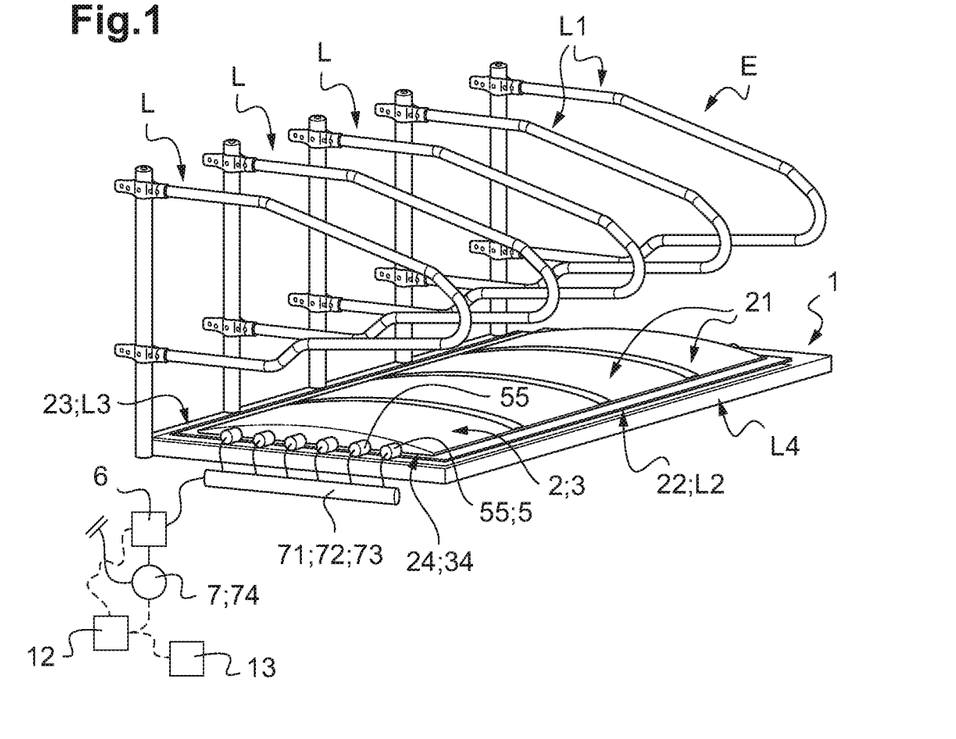
FIG. 1 is a schematic and perspective view of a series of stalls equipped with a comfort system comprising a comfort mattress according to the invention.

The comfort system 1 according to the invention is intended to equip a livestock enclosure E in which are arranged bedding boxes (FIG. 1).

The livestock enclosure E advantageously consists of a stable for cattle breeding, in particular dairy cattle and beef cattle.

The bedding boxes herein consist of stalls L, arranged along at least one line.

The stalls L constitute a compromise between a comfortable bedding for the cattle, the respect of the stand-up/lay-down movement, a comfortable standing position and a minimum of stain in the stall.

According to FIG. 1, each stall L, conventional per se, is delimited by:

two lateral partitions L1, for example tubular structures, a rear sill of the stall L2, extending along an access corridor, a front limit L3, advantageously comprising an upper bar at the withers and a lower stop (or forward limiter), forming the back of the stall L, and a ground L4, for example a concrete slab.

The comfort system 1 according to the invention, equipping this series of stalls L, is composed of the following elements:

at least one comfort mattress 2, covering the ground L4 of each of the stalls L and equipped with a resilient layer 3 including different sealed cavities 4, 5 intended to contain heat-transfer fluids, means 6 for regulating the temperature of a heat-transfer fluid (shown in FIG. 1), and means 7 for generating a circulation of a heat-transfer fluid within certain of the sealed cavities 5 of the resilient layer 3 (shown in FIG. 1).

Comfort Mattress

Figure 2:
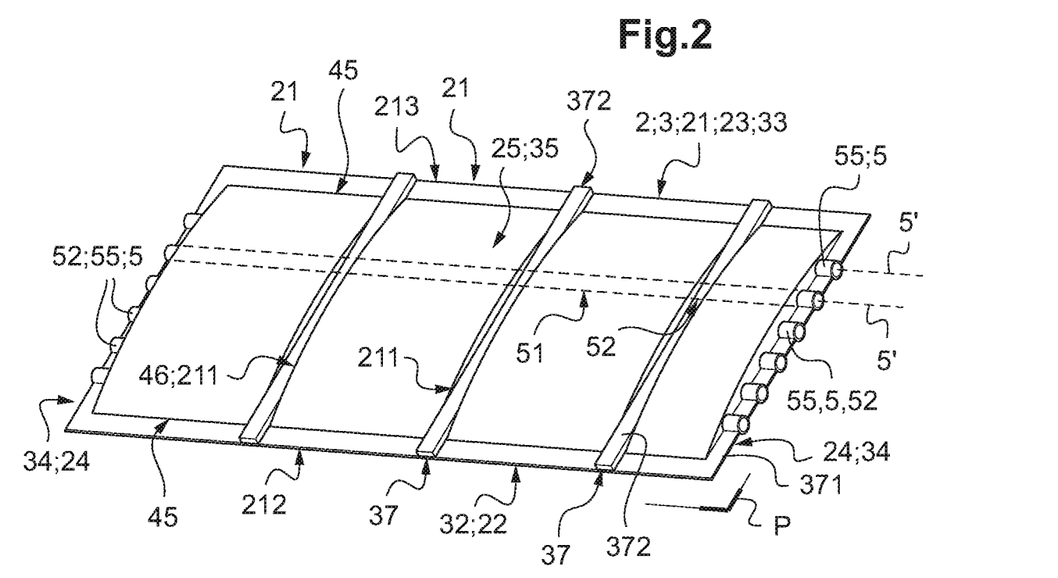
FIG. 2 is a schematic and perspective view of a comfort mattress according to the invention, whose resilient layer includes sealed chambers that are longitudinally juxtaposed to each other in series and through which pass watertight ducts.

The comfort system 1 herein comprises a continuous comfort mattress 2 that covers the ground L4 of the aligned stalls L. This comfort mattress 2 hence includes several accommodation areas 21 that are juxtaposed over the length of said comfort mattress 2 (FIGS. 1 and 2).

As an alternative, not shown, each stall L may contain its own comfort mattress 2 that then defines a single accommodation area 21.

The comfort mattress 2 has a generally rectangular shape that is delimited by two couples of edges, i.e.:

two longitudinal edges, i.e. a rear longitudinal edge 22 intended to extend along the rear sill L2 of the equipped stalls L, and a front longitudinal edge 23 intended to extend along the front limit L3 of the line of stalls L, and two transverse edges 24, intended to be located at the lateral partitions L1 of the two stalls L, at the end of the line.

The comfort mattress 2 also includes two opposite faces:

an upper face 25, adapted to undergo an elastic deformation and forming the accommodation areas 21 on which the animals are intended to rest, and a lower face 26, intended to rest on the ground L4 of the stalls L.

Each of the accommodation areas 21 of the comfort mattress 2 is herein intended to accommodate an animal.

Each accommodation area 21 hence corresponds to the surface area on the ground L4 of a stall L, and is laterally delimited by two above-mentioned lateral partitions L1.

Each of the accommodation areas 21 has hence a generally rectangular shape that is delimited by different edges (FIG. 2):

two lateral edges 211, each located in vertical alignment with a lateral partition L1 of the stall L, a rear edge 212, adjoining the rear sill L2 of the stall L (forming a portion of the rear longitudinal edge 22 of the comfort mattress 2), and a front edge 213, adjoining the front limit L3 of the stall L (forming a portion of the front longitudinal edge 23 of the comfort mattress 2).

Resilient Layer of the Comfort Mattress

According to the invention, the resilient layer 3 may form either a portion of the comfort mattress 2, or the whole comfort mattress 2.

In the first case, the comfort mattress 2 may include a lower comfort layer consisted by a plate of resilient (elastomeric) material, for example a plate of rubber granulates (aggregated or not, or of latex) or a plate of foam.

This lower comfort layer allows increasing the comfort when the animal enters the stall or is in standing position.

The comfort layer then forms the lower face of the comfort mattress 2. This comfort layer is enveloped in the resilient layer 3 forming a film, which replaces a conventionally implemented film (for example, elastomeric material, PVC or fabric).

In all the cases, this resilient layer 3 has a generally rectangular shape that is delimited by two couples of edges (FIG. 2):

two longitudinal edges, a rear one 32 and a front one 33, positioned respectively at the rear 22 and front 23 longitudinal edges of the comfort mattress 2, and two transverse edges 34, positioned respectively at the transverse edges 24 of the comfort mattress 2.

The resilient layer 3 has also two opposites faces:

an upper face 35, intended to form the upper face 25 of the comfort mattress 2, and a lower face 36, possibly forming the lower face 26 of the comfort mattress 2.

This resilient layer 3 is made of at least one material adapted to undergo an elastic deformation, also called "resilient material", chosen among:

the elastomeric materials, i.e. for example natural rubber, "synthetic natural" rubber (or synthetic poly-isoprene), polybutadiene or styrene-butadiene, or the plastic materials or thermoplastic elastomers (TPE), i.e. for example PVB (polyvinyl butyral), ABS (acrylonitrile butadiene styrene)/SBR (styrene-butadiene), PP (polypropylene)/EPDM (ethylene-propylene-diene monomer), TPU (polyurethane TPE).

This resilient layer 3 is advantageously made single-piece, either single-material (one material) or multi-material (with at least two superimposed sub-layers made of different materials).

The resilient layer 3 may also contain reinforcement sub-layers described hereinafter, chosen among textile fibres, metal fibres or any other product offering stability and/or elongation resistance.

These reinforcement sub-layers consist for example of a fabric insert/frame serving as a reinforcement, advantageously made of a material chosen among nylon, cotton, polyester, polyamide or any other reinforcement fabric.

The resilient layer 3 includes the different sealed cavities 4, 5, within its thickness and within its constitutive material. The resilient layer 3, and in particular the constitutive material thereof, hence defines directly a plurality of sealed cavities 4, 5.

Figure 4:
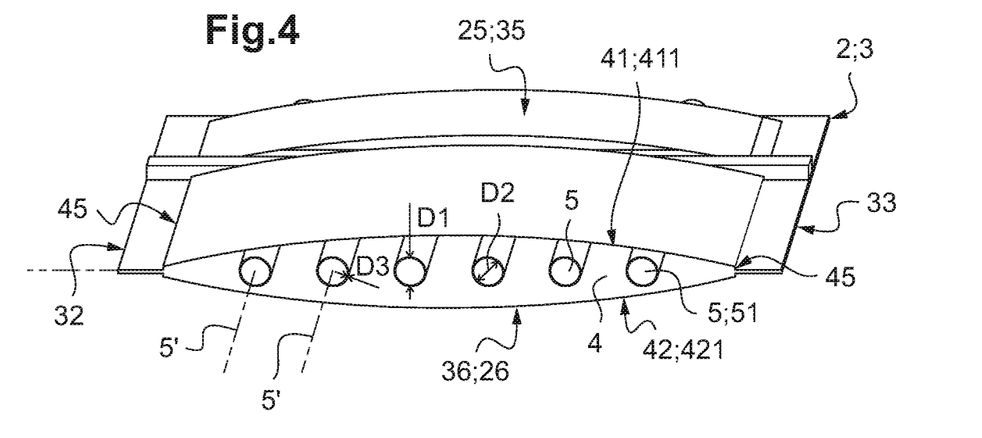
FIG. 4 shows a first embodiment of the resilient layer according to FIGS. 2 and 3, along a cutting plane parallel to the transverse edges thereof, the watertight ducts of which are juxtaposed to each other and independent from each other.
Figure 6:
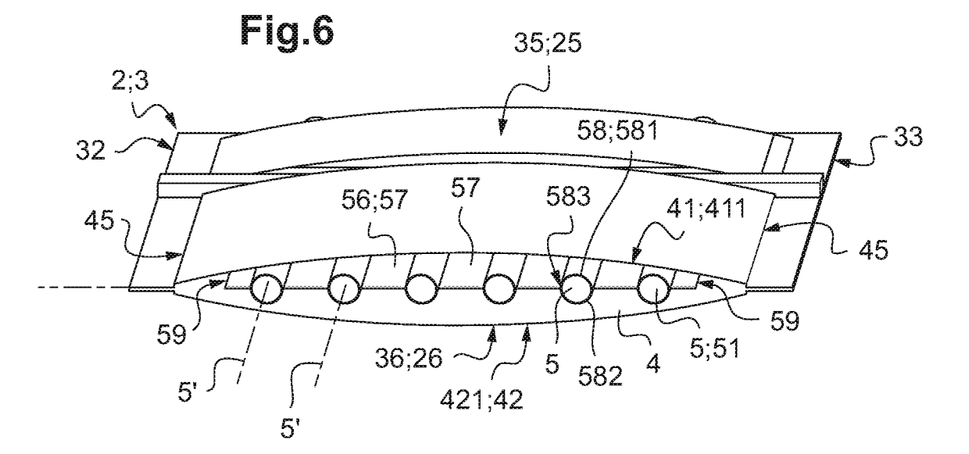
FIG. 6 shows a second embodiment of the resilient layer according to FIGS. 2 and 3, illustrated along a cutting plane parallel to the transverse edges thereof, the watertight ducts of which are formed in a longitudinal band.

Herein, this resilient layer 3, advantageously made single-piece, defines the following sealed cavities (FIGS. 4 and 6):

at least one sealed chamber 4 intended to contain a first heat-transfer fluid, extending under said at least one accommodation area 21, and at least one watertight duct 5 intended to contain a second heat-transfer fluid, at least a first section 51 of which passes through said at least one sealed chamber 4 so that said at least one first section 51 is intended to soak/to bathe in said first heat-transfer fluid.

The thermal regulation of the upper face 35 of the resilient layer 3 is performed by the first heat-transfer fluid filling said at least one sealed chamber 4, itself regulated by the second heat-transfer fluid in said at least one watertight duct 5 (and in particular the first section 51 thereof), which soaks in this first heat-transfer fluid.

Sealed Chambers

The resilient layer 3 advantageously includes at least two sealed chambers 4 that are arranged in series, each within one accommodation area 21.

Preferably, each accommodation area 21 includes one of these sealed chambers 4 (or even, two sealed chamber 4 transversally juxtaposed to each other) that is peculiar to it.

The resilient layer 3 hence includes a succession of juxtaposed sealed chambers 4, that each correspond to one of the accommodation areas 21.

Each sealed chamber 4 is delimited by two surfaces (FIG. 4):

an upper surface 41, herein formed by an upper skin 411 that also forms the upper face 35 of the resilient layer 3, and a lower surface 42, herein formed by a lower skin 421 that also forms the lower face 36 of the resilient layer 3.

Each sealed chamber 4 also includes, viewed from above, a rectangular perimeter corresponding at least approximately to the surface area of a stall L and of an accommodation area 21.

Figure 3:
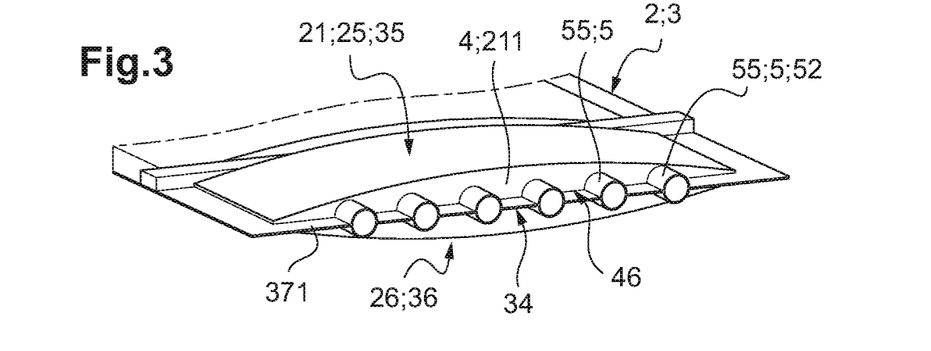
FIG. 3 is a partial and enlarged view of FIG. 2, showing one of the transverse edges of the resilient layer.

Each sealed chamber 4 is hence delimited by:
two longitudinal edges 45, parallel to the rear 32 and front 33 longitudinal edges of the resilient layer 3 (FIGS. 4 and 6), and
two transverse edges 46, arranged parallel to the transverse edges 34 of the resilient layer 3 (FIG. 3).

The fluid intended to fill each sealed chamber 4 is advantageously chosen among the water, a gas (in particular, air), a gel.

Each sealed chamber 4 is for that purpose associated with a through-orifice (not shown) for the access thereto, in particular for the filling and/or the draining thereof, for example an orifice equipped with a valve.

The valve is tightly connected to the through-orifice, for example via a metal crimp (also called "bulkhead valve").

The first fluid filling the sealed chamber 4 is fixed, i.e. with no phenomenon of circulation between two orifices (contrary to the second heat-transfer fluid filling the watertight ducts 5).

Each sealed chamber 4 is hence individual. And it is intended to recover its shape when the animal withdraws.

The upper surface of each sealed chamber 4 has advantageously a cross-section (along a plane parallel to the transverse edges 46—FIG. 4) that has a generally convex curved shape.

This particular shape forms front and rear slopes that favour the draining of the biological matters out of said comfort mattress 2.

Two juxtaposed sealed chambers 4 are (tightly) separated by a transverse band 37 extending between the longitudinal edges 32, 33 (FIG. 2). And the resilient layer 3 is terminated by two terminal transverse bands 371.

The transverse bands 37 have two functions:
they form the lines for the cutting at length of the resilient layer 3, so as to obtain the through-orifices 55 of the watertight ducts 5 at two terminal transverse bands 371, and
they are intended to be covered by a transverse fixation element 372, for example a baseboard, to allow a fixation of the resilient layer 3 while ensuring the passage of the second heat-transfer fluid.

The terminal transverse bands 371 hence form peripheral bands that delimit the sealed chambers 4.

Preferably, the final thickness of a sealed chamber 4 (herein at the rise thereof) is advantageously comprised between 10 and 150 mm, preferably between 10 and 100 mm.

Still preferably, the initial thickness of the resilient layer 3 (before filling) is comprised between 4 and 20 mm.

The sealed chambers 4 have for example a width (parallel to the longitudinal edges 32, 33) of the order of 1 m; the transverse bands 37 have advantageously a width of the order of 50 to 300 mm.

Generally, the sealed chambers 4 have also for interest to constitute damping elements, or buffers, extending above the watertight ducts 5.

Each sealed chamber 4 ensures a distribution of the weight of the animal within the accommodation area 21, and hence allows reducing significantly the bearing efforts exerted on the watertight ducts 5.

The risk of plugging, or deterioration, of the watertight ducts 5 by a phenomenon of crushing is hence significantly reduced. It is hence possible to reduce the pressure within the watertight ducts 5.

Watertight Ducts

Said at least one watertight duct 5, intended to contain a second heat-transfer fluid, passes through said at least one sealed chamber 4 between the upper 41 and lower 42 surfaces thereof so as to soak/to bathe in the above-mentioned first heat-transfer fluid.

The second heat-transfer fluid is advantageously chosen among the liquids, for example water or a water/glycol mixture.

The watertight ducts 5 advantageously consist of a tubular member made of an elastically deformable material, for example rubber.

The watertight ducts 5 are juxtaposed and each underlie a portion of the accommodation areas 21 of the comfort mattress 2. In other words, the accommodation areas 21 of the comfort mattress 2 overlie the watertight ducts 5 present.

For that purpose, the watertight ducts 5 each consist of a tubular structure having an elongated rectilinear shape, defining a longitudinal axis 5' (FIGS. 2, 4 and 6).

These watertight ducts 5 are herein six in number. Generally, the number of watertight ducts 5 is advantageously comprised between 5 and 10.

The watertight ducts 5 are distributed in a plane P extending parallel to the general plane of the comfort mattress 2 (or even to the surfaces 25, 26 of the comfort mattress 2 and/or to the faces 35, 36 of the resilient layer 3).

These watertight ducts 5 (in particular their respective longitudinal axes 5') hence extend parallel, or at least approximately parallel, with respect to the surfaces 25, 26 of the comfort mattress 2 and/or to the faces 35, 36 of the resilient layer 3.

The watertight ducts 5 also each extend over the whole length of the resilient layer 3, between the transverse edges 34 thereof (and advantageously over the whole length of the comfort mattress 2); and the watertight ducts 5 are distributed over the width of the resilient layer 3, between the longitudinal edges 32, 33 thereof (and advantageously over the width of the comfort mattress 2).

These watertight ducts 5 (in particular their respective longitudinal axes 5') hence extend parallel, or at least approximately parallel, relative to each other and with respect to the longitudinal edges 32, 33 of the resilient layer 3.

The watertight ducts 5 pass successively through the sealed chambers 4 arranged in series.

Each watertight duct 5 hence includes an alternation of successive sections (distributed in series—one of these watertight ducts 5 is schematically shown in FIG. 2, in discontinuous line):
first sections 51, free, each passing through a sealed chamber 4, and
second sections 52, captive, each tightly passing through a transverse band 37.

Each first section 51 extends between the opposite lateral edges 211 of an accommodation area 21, perpendicular to these latter.

This first section 51 hence extends between the two transverse bands 37 (forming two opposite peripheral bands) delimiting a sealed chamber 4.

This first section 51 also passes through this sealed chamber 4, between the upper 41 and lower 42 surfaces thereof and herein between the opposite transverse edges 46 thereof, so that this first section 51 is intended to soak/to bathe in the first heat-transfer fluid.

Each second section 52 is embedded into a transverse band 37. There is hence a fluid tightness at the second sections 52 incorporated in the transverse band 37 (preventing the fluid transfers between the juxtaposed sealed chambers 4).

This second section 52 is intended to pass through a transverse band 37 over the width thereof (between the juxtaposed lateral edges 211 of two accommodation areas 21 or, in other words, between the transverse edges 46 of two juxtaposed sealed chambers 4), so as to extend between two juxtaposed sealed chambers 4.

The watertight ducts 5 are each intended to contain the second heat-transfer fluid that is put in circulation over the respective lengths thereof, to regulate the temperature of the first heat-transfer fluid filling the sealed chambers 4 and, as a corollary, the temperature of the upper face 25 of the comfort mattress 2.

For that purpose, each of the watertight ducts 5 is terminated by two through-orifices 55 that are each arranged at one of the transverse edges 34 of the resilient layer 3 (in particular a terminal transverse band 371).

These through-orifices 55 allow a fluid connection with the means 6 for regulating the temperature and with the means 7 for generating the circulation of the heat-transfer fluid.

Herein, each through-orifice 55 of a watertight duct 5 is advantageously formed by a second section 52 of said watertight duct 5 that passes transversally through a terminal transverse band 371 (at the end of the resilient layer 3).

The watertight ducts 5 are herein fluidically independent from each other. In this case, the piercing of one of the watertight ducts 5 would not cause the draining of the whole watertight ducts 5 of the resilient layer 3.

Each of the watertight ducts 4 hence includes two through-orifices 55 that are peculiar to it, for the circulation of the heat-transfer fluid.

The through-orifices 55 herein open directly at the transverse edges 35 of the resilient layer 3 (in particular terminal transverse bands 371). As an alternative, not shown, the through-orifices 55 on a same side open into a transverse duct formed in the resilient layer 3, itself opening at an edge of said resilient layer 3.

The through-orifices 55 are advantageously obtained by a cutting of the resilient layer 3 at length, along a cut line oriented perpendicular to the longitudinal edges 32, 33, and over the length of a transverse band 37 formed between two sealed chambers 4 (to generate two terminal transverse bands 371).

Indeed, the resilient layer 3, before its installation, is advantageously stored as a roll having a length of several metres, in particular higher than 3 m long.

This roll embodiment has for interest to allow a simple and fast installation of the resilient layer 3 within the livestock enclosure, by unwinding along a line of stalls $\underline{L}$ then cutting at the desired length for this line.

Moreover, the thickness of the material forming the watertight duct 5 is advantageously minimum, to favour the thermal transfer by a phenomenon of conduction through said material.

Generally, as shown in FIG. 4, each watertight duct 5 (in particular, the first sections 51) includes:
- an outer diameter $\underline{D1}$ (outer surface) comprised between 25 and 100 mm,
- an inner diameter $\underline{D2}$ (inner surface) comprised between 10 and 98 mm, and
- a wall thickness $\underline{D3}$ (thickness between the outer and inner surfaces) comprised between 0.5 and 2.5 mm.

The watertight ducts 5 are moreover spaced apart from each other by a distance comprised between 20 and 200 mm (distance between the outer surfaces of these watertight ducts 5).

Two particular embodiments of this comfort mattress 2 according to the invention, and in particular of these watertight ducts 5, will be described hereinafter.

Figure 5:
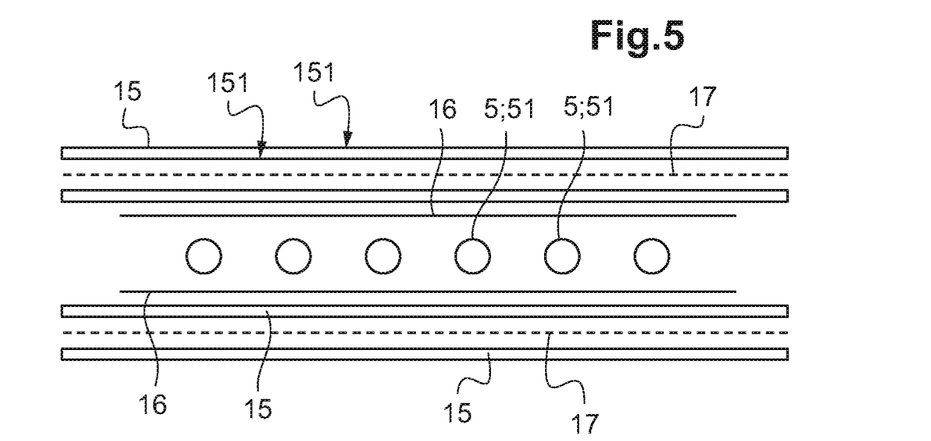
FIG. 5 is a schematic and side view of the different parts intended to be assembled to constitute the resilient layer of the comfort mattress according to FIG. 4.

First Embodiment—FIGS. 4 and 5

In a first embodiment, the watertight ducts 5 are juxtaposed to each other and independent from each other.

These watertight ducts 5 are then advantageously in the form of pipes as developed hereinafter in relation with FIG. 5 (denoted by the same reference 5 for the sake of simplification), advantageously made of rubber material.

Each sealed chamber 5 hence extends all over these watertight ducts 5, with a possible circulation of the first heat-transfer fluid in the space separating the first sections 51 from these watertight ducts 5.

Figure 7:
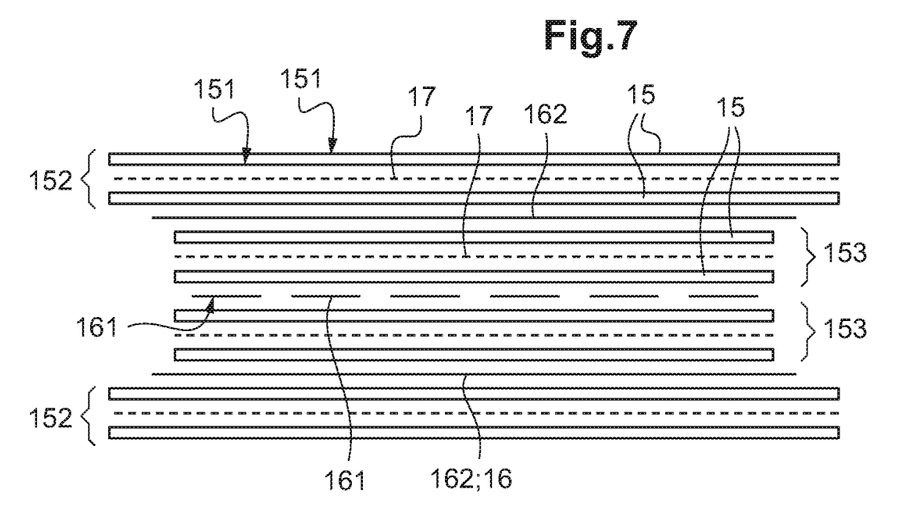
FIG. 7 is a schematic and side view of the different parts intended to be assembled to constitute the resilient layer of the comfort mattress according to FIG. 6.

Second Embodiment—FIGS. 6 and 7

In a second embodiment, the watertight ducts 5 are formed in at least one longitudinal band 56. These watertight ducts 5 are hence connected to each other by interlayer bands 57 (herein rectangular).

This longitudinal band 56, and the interlayer bands 57 thereof, extend parallel to the longitudinal edges 32, 33 of the resilient layer 3.

Moreover, each watertight duct 5 is delimited by two opposite surfaces 58, an upper surface 581 and a lower surface 582, that meet each other at two lateral edges 583 (FIG. 6).

Each watertight duct 5 has herein a vertical cross-section that, in the empty state (not shown), is of flat or planar shape: the distance between the lateral edges 583 (width) is higher than the distance between the opposite upper 581/lower 582 surfaces thereof (height).

When a watertight duct 5 is filled with fluid, the vertical cross-section thereof is for example round, oval or elliptic, as a function in particular of the fluid pressure, with:
- the upper 581/lower 582 surfaces, which are curved, concave, and
- a long axis (passing by the lateral edges 583 thereof), which extends parallel to the faces 35, 36 of the resilient layer 3.

By way of indication only, in the empty state, the watertight ducts 5 have advantageously a width, between their respective two lateral edges 583, comprised between 70 and 100 mm.

The watertight ducts 5 are moreover spaced apart from each other by a distance comprised between 80 and 130 mm (corresponding to the width of the interlayer bands 57).

These watertight ducts 5, filled with fluid, each have for example a height (along their vertical short axis) comprised between 60 and 100 mm.

The longitudinal band 56 is also delimited by two longitudinal edges 59 that define the width thereof.

These two longitudinal edges 59 extend parallel to and remote from the longitudinal edges 32, 33 of the resilient layer 3 to form lateral openings.

The width of this longitudinal band 56 is lower than the width of the sealed chambers 4 (corresponding to the distance between the longitudinal edges 45 of these latter).

Each sealed chamber 5 hence extends all over this longitudinal band 56, with a possible circulation of the first heat-transfer fluid through the opening separating a longitudinal edge 59 of the longitudinal band 56 and the longitudinal edge 45 opposite the sealed chamber 4.

Heat-Transfer Fluid Circulation Means

Moreover and generally, the comfort system 1 includes the means 7 for generating the circulation of the second heat-transfer fluid, also called "circulation means" (FIG. 1).

These circulation means 7 ensure a distribution and a parallel circulation of the second heat-transfer fluid, along the watertight ducts 5.

These circulation means 7 comprise for that purpose:
upstream fluid connection means 71, for fluid supply, which are connected in parallel to the through-orifices 55 of the watertight ducts 55 located at a first transverse edge 34 of the resilient layer 3, and
downstream fluid connection means 72 (also denoted in FIG. 1 for the sake of simplification), for collecting the fluid at the exit, which are connected in parallel to the through-orifices 55 of the watertight ducts 5 located at a second transverse edge 34 of the resilient layer 3.

The upstream 71/downstream 72 fluid connection means each include in particular a device of the perforated-tube type 73, in order to ensure the parallel circulation of the heat-transfer fluid within each of the watertight ducts 5.

The connection of a perforated tube 73 with the adjoining through-orifices 55 is advantageously performed through conventional mechanical sealing means.

These upstream 71/downstream 72 fluid connection means may be fluidically connected to each other for the recirculation or the recycling of this heat-transfer fluid.

The circulation means 7 also comprise a pump 74, to cause the circulation of the second heat-transfer fluid.

The upstream fluid connection means 71 are advantageously equipped with pressure regulation means and/or flow regulation means.

Hence, the pressure within the watertight ducts 5 is advantageously adjusted between 0.25 and 4 bars, preferably between 1 and 1.5 bars.

The upstream fluid connection means 71 are moreover advantageously equipped with means for regulating the flow rate within each of the watertight ducts 5.

Temperature Regulation Means

The means 6 for regulating the temperature of the heat-transfer fluid (also called "regulation means 6") equip the circulation means 7, advantageously at the upstream fluid connection means 71.

These regulation means 6 are chosen among means adapted to heat up and/or cool down the heat-transfer fluid.

For example, these regulation means 6 consist in a reversible heat pump with temperature measurement.

The regulation means 6 advantageously comprise:
means for measuring the temperature of this second heat-transfer fluid, for example a temperature probe, and
possibly, means for displaying the temperature measured.

These regulation means 6 are optional, in particular in the case where the second heat-transfer fluid is initially at the desired temperature (for example, a source of fresh water for cooling down the comfort mattress 2).

Control Means

The comfort system 1 also advantageously includes control means 12 for piloting the operation of the regulation means 6 and of the circulation means 7.

These control means 12 are chosen for example among:
manual control means,
control means of the scheduler type (for an operation according to predefined cycles), and
automatic control means, in particular advantageously a computer program executed by a computer.

These control means 12 are then advantageously also connected with means 13 for measuring the temperature within the livestock enclosure E.

Operation

First, the comfort mattress 2 is placed so as to cover the ground L4 of the aligned stalls L.

This comfort mattress 2 is adjusted longitudinally so that each accommodation area 21 is positioned within a stall L.

In particular, each sealed chamber 4 is arranged within a stall L; and the transverse bands 37 are intended to each come in position at one lateral separation L1.

The sealed cavities 4, 5 of the resilient layer 3 are then filled with the heat-transfer fluids:
the sealed chambers 4 are filled with the first heat-transfer fluid, and
the watertight ducts 5 are filled with the second heat-transfer fluid.

Preferably, the fluid pressures are adjusted as follows in the sealed cavities 4, 5:
a pressure in first heat-transfer fluid (in each sealed chamber 4) of the order of 1 atm (or slightly higher, for example of a few grams), with no animal, or even 0.9 to 1.1 bars during the bearing of a lying-down animal of the order of 1000 kg, and
a pressure in second heat-transfer fluid (in the watertight ducts 5) from 0.25 to 4 bars.

More generally, the pressure in first heat-transfer fluid may be adjusted in real time as a function of the atmospheric pressure.

The first heat-transfer fluid hence envelops (advantageously over 360°) the watertight ducts 5, and in particular the first sections 51 thereof.

This particularity provides a maximum heat exchange surface between, on the one hand, the first heat-transfer fluid contained in the sealed chamber 4 and, on the other hand, the second heat-transfer fluid contained in the watertight ducts 5.

In order to prevent a potential thermal stress, the control means 12 may pilot automatically the regulation means 6 and the circulation means 7, advantageously taking into account the ambient temperature within the livestock enclosure E acquired by the measurement means 13.

In the presence of unfavourable surrounding thermal conditions, the control means 12 then generate:
a circulation of the second heat-transfer fluid in the watertight ducts 5 of the comfort mattress(es) 2 by means of the circulation means 7, and
a regulation of the temperature of the second heat-transfer fluid by means of the regulation means 6,
so as to adjust the temperature of first heat-transfer fluid contained in the sealed chambers 5 and of the upper face 25 of the comfort mattress 2.

The circulation of the second heat-transfer fluid in the watertight ducts 5 is herein performed in parallel: the flow of second heat-transfer fluid is split so as to pass through these watertight ducts 5 in a simultaneous manner.

This circulation of the heat-transfer fluid is also performed in a same direction within the juxtaposed watertight ducts 5: the fluid then circulates from the through-orifices 55 located at a first transverse edge 34 of the resilient layer 3 (on the left in FIG. 1) to the through-orifices 55 located at a second transverse edge 34 of the resilient layer 3 (on the right in FIG. 1).

Herein, a heat exchange is generated at the first sections 51 of the watertight ducts 5 passing through a sealed chamber 4 between, on the one hand, the first heat-transfer fluid contained in this sealed chamber 4 and, on the other hand, the second heat-transfer fluid contained in the watertight ducts 5.

In cooling-down mode, the second heat-transfer fluid may be naturally cold (for example, a source of water at a temperature comprised between 1° C. and 15° C.) or it may be cooled down by the regulation means 6. The comfort system 1 according to the invention hence allows providing directly a reduction of the temperature of the animal within its stall L.

Hence, in power-on configuration, the comfort system 1 according to the invention allows cooling down the upper face 25 of the comfort mattress 2, which cools down the hair coat of the cow and which limits the increase of its body temperature.

On the reverse, in heating mode, the second heat-transfer fluid is heated up. The comfort system 1 according to the invention allows providing directly heat to the animal inside its stall L.

When the risk of thermal stress is eliminated, the control means 12 automatically pilot the stopping of the circulation means 7 and the regulation means 6.

Manufacturing of the Resilient Layer

The resilient layer 3 according to the invention may be manufactured by assembly of a sub-set of superimposed layers, to form a unit of the single-piece type.

The technology of assembly may be chosen for example among—vulcanization,—bonding,—welding.

As illustrated in FIG. 5 for the first embodiment and in FIG. 7 for the second embodiment, the method of manufacturing the resilient layer 3 comprises:

(i) a step of superimposing sub-layers of elastomeric material 15 including two opposite surfaces 151, between which are added:
  interlayer means 16 adapted to prevent locally the fastening together of the opposite surfaces 151 of said layers 15 to form said at least one sealed chamber 4, or even to also form said at least one watertight duct 5 in the longitudinal band 56,
  said at least one watertight duct 5, at least one first section 51 of which is added between the interlayer means 16, and
  possibly, reinforcement layers 17 added between couples of sub-layers of elastomeric material 15, then (ii) a step of fastening the surfaces 151 in contact of said superimposed sub-layers 15 (i.e. outside the outline of the interlayer means 16), so that the interlayer means 16 form said at least one sealed chamber 4 surrounding the first section 51 of said at least one watertight duct 5, or even also the watertight ducts 5 in the longitudinal band 56.

The interlayer means 16 consist of any means avoiding the fastening together of the opposite surfaces 151 of the layers 15 to be assembled.

In the case of a vulcanization, the interlayer means 16 consist for example of bands or tubes that are advantageously made of a material chosen among:
  a fire-protection film containing a retardant, for example made of polypropylene, acrylonitrile butadiene styrene,
  a layer of silicone,
  a layer of a vulcanized elastomeric material, for example a pipe made for example of styrene-butadiene rubber (SBR), natural rubber (NR), or ethylene propylene diene monomer.

These interlayer means 16 are in particular arranged between two elastomeric sub-layers 15 to be assembled to each other.

Generally, these interlayer means 16 are bespoke distributed, as a function of the desired arrangement for the sealed chambers 4 and, as the case may be, the watertight ducts 5.

These interlayer means 16 are in particular distributed so as to form, between them, the transverse bands 37 separating the sealed chambers 4.

Herein, as illustrated in FIG. 5 for the first embodiment, the step of superimposition comprises a superimposition of two couples of sub-layers of elastomeric material 15. Two sub-layers of interlayer means 16 are added between two of said sub-layers of elastomeric material 15 to form the sealed chambers 4.

Watertight ducts 5 are also added so that at least one first section 51 of these watertight ducts 5 is arranged between the interlayer means 16.

The watertight ducts 5 consist for example of pipes made of rubber material. These watertight ducts 5 are distributed as a function of the desired positioning of the resilient layer 3.

The interlayer means 16 are formed by several rectangles 16 that are distributed over the length of the sub-layers of elastomeric material 15, to form the sealed chambers 4 separated by the transverse bands 37.

As illustrated in FIG. 7 for the second embodiment, the step of superimposition comprises a superimposition of four couples of sub-layers of elastomeric material 15 with three sub-layers of interlayer means 16 that are each added between two sub-layers of elastomeric material 15.

In particular, the superimposition comprises the following sub-layers of elastomeric material 15:
  two outer couples 152, intended to form the skins 411, 421 and to delimit the sealed chamber 4, and
  two inner couples 153, intended to form together the longitudinal band 56 carrying the watertight ducts 5.

The width of the inner couples 153 is herein lower than the width of the outer couples 152. And the inner couples 153 are herein centred with respect to the outer couples 152.

Each outer 152/inner 153 couple hence comprises two sub-layers of elastomeric material 15 that take reinforcement layers 17 in sandwich.

This superimposition also comprises the following interlayer means 16:
  an inner sub-layer including several bands 161 that are juxtaposed over the width of the opposite inner couples 153 to form the juxtaposed watertight ducts 5, and
  two outer sub-layers including several rectangles 162 that are distributed over the length of the sub-layers of elastomeric material 15, between an inner couple 153 and an outer couple 152, to form the sealed chambers 4.

To form a sealed chamber 4, the width of a rectangle 162 is, on the one hand, lower than the width of the outer couples 152 and, on the other hand, higher than the width of the inner couples 153.

As an alternative, not shown, the longitudinal band 56 (provided with watertight ducts 5) is manufactured in a first time.

This longitudinal band 56 is then added between the two outer sub-layers 162 of the interlayer means 16, themselves between the two outer couples 152 intended to form the skins 411, 421.

Generally, the comfort system according to the invention has for interest to implement comfort mattresses whose upper face is optimally regulated in temperature, so as to ensure an optimum thermal comfort for the animals.

The comfort mattresses have for interest to be installed in a conventional way, advantageously by being unwound from a wall to another.

The surface pressure on the animal is reduced with respect to a bedding on a concrete structure. The blood circulation of the animal is improved.

The invention claimed is:

1. A mattress for thermal comfort of animals in a livestock enclosure, the mattress comprising:
    at least one resilient layer having two opposite faces including an upper face configured to undergo an elastic deformation and including at least one accommodation area on which an animal is able to rest, and a lower face configured to rest on a receiving surface, the at least one resilient layer having a generally rectangular shape that is delimited by two pairs of edges including two longitudinal edges and two transverse edges, the at least one resilient layer including:
    at least one sealed chamber configured to contain a first heat-transfer fluid and extending under said at least one accommodation area, said at least one sealed chamber being delimited by an upper surface and a lower surface,
    a plurality of watertight ducts configured to contain a second heat-transfer fluid, at least one section of each of the watertight ducts passing through said at least one sealed chamber, the watertight ducts extending parallel or approximately parallel relative to each other, the watertight ducts having a rectilinear shape, the watertight ducts extending parallel or approximately parallel to the longitudinal edges of the at least one resilient layer, the watertight ducts each including at least two duct through-orifices configured to generate a circulation of the second heat-transfer fluid within the watertight ducts between the duct through-orifices, the duct through-orifices of each of the watertight ducts being arranged at one of the transverse edges of the at least one resilient layer, the at least one section of each of the watertight ducts passing through the at least one sealed chamber between the upper and lower surfaces thereof so that said at least one section is configured to soak or bathe in said first heat-transfer fluid, and
    at least one resilient layer through-orifice for access to said at least one sealed chamber.

2. The mattress for thermal comfort of animals according to claim 1, wherein said watertight ducts are juxtaposed to each other and independent from each other.

3. The mattress for thermal comfort of animals according to claim 2, further comprising at least two of said sealed chambers that are arranged in series, each of the sealed chambers being within one accommodation area, and
    wherein the watertight ducts pass successively through said at least two sealed chambers arranged in series.

4. The mattress for thermal comfort of animals according to claim 1, wherein the watertight ducts are formed in at least one longitudinal band and are connected by interlayer bands.

5. The mattress for thermal comfort of animals according to claim 4, further comprising at least two of said sealed chambers that are arranged in series, each of the sealed chambers being within one accommodation area, and
    wherein the watertight ducts pass successively through said at least two sealed chambers arranged in series.

6. The mattress for thermal comfort of animals according to claim 1, further comprising at least two of said sealed chambers that are arranged in series, each of the sealed chambers being within one accommodation area, and
    wherein the watertight ducts pass successively through said at least two sealed chambers arranged in series.

7. The mattress for thermal comfort of animals according to claim 1, wherein said at least one resilient layer is a single piece, and
    wherein said at least one resilient layer defines said at least one sealed chamber and said watertight ducts.

8. The mattress for thermal comfort of animals according to claim 1, wherein said at least one sealed chamber is delimited by peripheral bands, and
    wherein said watertight ducts include at least two sections embedded in at least one of said peripheral bands.

9. A system for thermal comfort of animals in a livestock enclosure, said system comprising:
    at least one comfort mattress according to claim 1; and
    a circulation system configured to generate a circulation of said second heat-transfer fluid within said at least one watertight ducts, between the duct through-orifices.

10. A livestock enclosure equipped with the comfort system according to claim 9.

11. The system according to claim 9, further comprising a temperature regulation system configured to regulate the temperature of said second heat-transfer fluid.

12. A method for improving the thermal comfort of the animals in the livestock enclosure according to claim 10, the method comprising:
    circulating the second heat-transfer fluid within said watertight ducts of said at least one comfort mattress, and
    thereby regulating the temperature of said first heat-transfer fluid and the upper face of said at least one comfort mattress.

13. A method of manufacturing the comfort mattress according to claim 1, said manufacturing method comprising:
    superimposing sub-layers of elastomeric material including two opposite surfaces and having a generally rectangular shape that is delimited by the two longitudinal edges and the two transverse edges, an interlayer system and the watertight ducts being added between the sub-layers of elastomeric material, the at least one section of each of the watertight ducts being added between the interlayer system, the interlayer system comprising at least one band or tube configured to locally prevent fastening together of said opposite surfaces of said sub-layers to form said at least one sealed chamber; and
    fastening the surfaces of said superimposed sub-layers in contact, outside the outline of the interlayer system, so that the interlayer system forms said at least one sealed chamber surrounding the at least one first section of said watertight ducts.

14. The method according to claim 12, further comprising regulating the temperature of second said heat-transfer fluid.

* * * * *